(12) United States Patent
Zeng et al.

(10) Patent No.: US 10,414,146 B2
(45) Date of Patent: Sep. 17, 2019

(54) APPARATUS FOR PASTING WARM EDGE SPACER

(71) Applicant: TENON (BEIJING) EQUIPMENT CO., LTD., Beijing (CN)

(72) Inventors: Haodong Zeng, Beijing (CN); Gang Liu, Beijing (CN); Genli Zhu, Beijing (CN)

(73) Assignee: TENON (BEIJING) EQUIPMENT CO., LTD., Beijing (CN)

( * ) Notice: Subject to any disclaimer, the term of this patent is extended or adjusted under 35 U.S.C. 154(b) by 209 days.

(21) Appl. No.: 15/331,701

(22) Filed: Oct. 21, 2016

(65) Prior Publication Data

US 2018/0056639 A1 Mar. 1, 2018

(30) Foreign Application Priority Data

Aug. 26, 2016 (CN) .......................... 2016 1 0743061

(51) Int. Cl.
| | | |
|---|---|---|
| *B32B 38/18* | (2006.01) | |
| *B32B 38/00* | (2006.01) | |
| *B32B 37/22* | (2006.01) | |
| *E06B 3/673* | (2006.01) | |

(52) U.S. Cl.
CPC ........ *B32B 38/1833* (2013.01); *B32B 37/223* (2013.01); *B32B 38/0004* (2013.01); *E06B 3/6733* (2013.01); *B32B 2315/08* (2013.01)

(58) Field of Classification Search
CPC ............ B32B 38/1833; B32B 38/0004; B32B 37/223; B32B 2315/08
See application file for complete search history.

(56) References Cited

U.S. PATENT DOCUMENTS

| | | | |
|---|---|---|---|
| 5,136,871 A * | 8/1992 | Lisec ..................... | B21D 53/74 72/294 |
| 2016/0288185 A1* | 10/2016 | Lattuada ................ | B21D 5/004 |

* cited by examiner

*Primary Examiner* — Mark A Osele
*Assistant Examiner* — Christopher C Caillouet
(74) *Attorney, Agent, or Firm* — Vidas, Arrett & Steinkraus (57) ABSTRACT

The present disclosure provides an apparatus for pasting a warm edge spacer, comprising: a first and a second conveying mechanism; a rotating mechanism for driving the second conveying mechanism to rotate; a conveying tunnel set in both the first conveying mechanism and the second conveying mechanism; a pressing unit set at the front of the second conveying mechanism; a cutting unit set at the side of the pressing unit; a positioning unit set at the lower side of the pressing unit in correspondence to the exit of the warm edge spacer, and an auxiliary pressing unit set at the upper side of the pressing unit; a pasting unit set at the other side of the warm edge spacer which is opposite to glass. The apparatus for pasting a warm edge spacer can implement automatic pasting operation of warm edge spacer.

9 Claims, 4 Drawing Sheets

APPARATUS FOR PASTING WARM EDGE SPACER

FIELD OF THE INVENTION

The present disclosure relates to spacer pasting technology, in particular to an apparatus for pasting warm edge spacer.

BACKGROUND

Most spacers used in the conventional insulated glass are metal spacer (such as aluminum spacer), and some manufacturers have developed plastic spacer made of recycled plastics. However, the insulated glass manufacturers generally use approximately the same manufacture process: 1) bending and cutting the spacer; 2) injecting desiccant (molecular sieve) into the formed spacer frame; 3) coating the spacer frame in which desiccant has been injected with butyl rubber sealant; and 4) manually placing the spacer frame onto the desired position of the processed glass, pressing the glass together with another piece of glass, and injecting a second sealant. In this way, the pasting work of the spacer is time-consuming and laborious. Because of the manual errors (especially the existence of a certain angle between the spacers in the same insulated glass), the yield of the insulated glass is relatively lower. In the meantime, due to better performance and effectiveness of the warm edge spacer as a type of spacers, more and more companies choose such spacer for fabricating insulated glass.

Therefore, the inventor found the prior art had at least the following defects while implementing the present invention: the efficiency and accuracy of pasting the spacer are low-performing.

SUMMARY OF THE INVENTION

In view of this, an object of an embodiment of the present disclosure is to provide an apparatus for pasting warm edge spacer, which can implement automatic pasting operation of warm edge spacer and improve the efficiency and accuracy of pasting warm edge spacer.

Based on the above-described object of the embodiment of the present disclosure, it provides an apparatus for pasting warm edge spacer, comprising:

a first conveying mechanism located at the back and a second conveying mechanism located at the front;

a rotating mechanism, set on the first conveying mechanism and can drive the second conveying mechanism to rotate;

a conveying tunnel, mutually connected between the first conveying mechanism and the second conveying mechanism, wherein a warm edge spacer is able to be conveyed from the back-end of the first conveying mechanism to the front-end of the second conveying mechanism through the conveying tunnel;

a cutting unit, a pressing unit, an auxiliary pressing unit, a positioning unit and a pasting unit, all which are set at the front of the second conveying mechanism, wherein the cutting unit is set at one side of the pressing unit, the positioning unit is set at the lower side of the pressing unit in correspondence to the exit of the warm edge spacer, the auxiliary pressing unit is set at the upper side of the pressing unit, and the pasting unit is configured to paste the warm edge spacer onto a glass from one side of the glass;

wherein the cutting unit cuts the unnecessary waste from the warm edge spacer in the pressing unit, then the positioning unit and the auxiliary pressing unit position a conveyed warm edge spacer at a preset position on the glass, and the pasting unit pastes a positioned warm edge spacer onto the glass at last.

Optionally, the pressing unit comprises a holding plate at the lower side, a pressing plate at the upper side and a pressing driving unit; the pressing driving unit drives the pressing plate to move towards the holding plate so that the warm edge spacer is pressed tightly; the pressing plate is configured with a cutting groove in correspondence to the side of the cutting unit so that the cutting unit enters the pressing unit and cuts the waste from the warm edge spacer; a waste hole is set at the upper side of the pressing plate, and the waste hole connects to a waste collecting device via a pipe.

Optionally, the auxiliary pressing unit comprises an auxiliary driving part, a pressing bar and a driving part; the auxiliary driving part drives the pressing bar to rotate via the driving part so that the warm edge spacer is pressed and positioned on the positioning unit; the pressing bar is configured with a roller structure in correspondence to the position of the warm edge spacer, and the roller structure rotates freely.

Optionally, the positioning unit comprises a positioning plate and a positioning plate driving unit, and the positioning plate driving unit drives the positioning plate to move.

Optionally, the pasting unit comprises a pushing part and a pushing driving unit, the pushing driving unit drives the pushing part to push the warm edge spacer so that the warm edge spacer is pasted on the glass; and the pushing part is configured with a roller structure in correspondence to the position of the warm edge spacer, and the roller structure rotates freely.

Optionally, the apparatus for pasting warm edge spacer further comprising a rotation monitoring device; wherein the rotation monitoring device comprises a rotating wheel, a screw, a location-limiting plate, location-limiting parts and a monitoring sensor; the rotating wheel rotationally connects to a rotating part of the second conveying mechanism and rotates with the rotating part synchronously, the screw connects to the rotating wheel and the location-limiting plate respectively so that the rotation of the rotating wheel transforms into the linear motion of the location-limiting plate; the location-limiting part is set at both the front and back side of the location-limiting plate, and the monitoring sensor is set at the side of the location-limiting plate.

Optionally, the apparatus for pasting warm edge spacer further comprising a guiding wheel and a location-limiting wheel, wherein the guiding wheel and the location-limiting wheel are set at the corresponding positions where the warm edge spacer is conveyed by the first conveying mechanism and the second conveying mechanism; the guiding wheel is used for guiding the moving direction of the warm edge spacer, and the location-limiting wheel is used for limiting the position of the warm edge spacer horizontally and longitudinally.

Optionally, the apparatus for pasting warm edge spacer further comprising a dynamic conveying unit, wherein the dynamic conveying unit comprises a driving wheel, a driven wheel, a driving wheel driving unit and a driven wheel driving unit; the warm edge spacer is set on the driving wheel, the driving wheel driving unit drives the driving wheel to rotate; the driven wheel can rotate freely, and the driven wheel driving unit drives the driven wheel to approach the driving wheel so that the warm edge spacer is pressed on the driving wheel.

Optionally, the apparatus for pasting warm edge spacer further comprising a connecting plate and a positioning driving device, wherein the first conveying mechanism is set on the connecting plate via a guide rail, the connecting plate connects the apparatus for pasting warm edge spacer entirely to a preset position; and the positioning driving device drives the first conveying mechanism to move along the guide rail.

Optionally, the apparatus for pasting warm edge spacer further comprising a zero-crossing detecting unit and a limit positioning unit, wherein the zero-crossing detecting unit detects the initial starting position of the apparatus for pasting warm edge spacers; and the limit positioning unit detects the front and back limit position of the motion of the apparatus for pasting warm edge spacer and limits the motion of the apparatus for pasting warm edge spacer when reaches the limit position.

As can be seen from the above, the apparatus for pasting warm edge spacer provided by the embodiments of the present disclosure, employs the first conveying mechanism and the second conveying mechanism set at the front and back and the rotating mechanism for driving the second conveying mechanism to rotate so that the warm edge spacer can automatically rotate and be pasted continually, and employs a cutting unit, a pressing unit, an auxiliary pressing unit, a positioning unit and a pasting unit so that the conveyed warm edge spacer can be pasted on a corresponding position on the glass quickly and steadily. Therefore, the apparatus for pasting warm edge spacers of the present disclosure can implement the pasting operation of the warm edge spacer quickly, steadily and automatically so that the efficiency and accuracy of pasting the warm edge spacer can be further improved.

DETAILED DESCRIPTION

The present disclosure is described more fully hereinafter with reference to the accompanying drawings so that the objects, technical solutions and advantages of the present disclosure will become more apparent.

It will be understood that, the terms "first", "second" etc. used herein is to distinguish various elements or parameters with the same name for the convenience. The embodiments of the present disclosure should not be limited by these terms and the specific description of these terms for the embodiments would be omitted hereinafter.

Aiming at the flaw which the spacer in the existing insulated glass needs to be pasted manually, the present disclosure provides an apparatus for pasting warm edge spacer, which replaces the conventional independent processing technic, removes the procedure which had to be accomplished manually such as bending and cutting processing, injecting desiccant, coating butyl rubber sealant, placing frame manually and etc., and automatically pastes the spacers on the manufactured glass with single layer or multiple layers to be pressed together with another piece of glass. In this way, it not only saves lots of effort, but also greatly improves the efficiency of manufacturing the insulated glass, so that the productivity of the insulated glass may reach three times of the conventional processor more. Since the desired procedure is accomplished via automatic control through the whole process by the present disclosure, the quality of the conventional process can't compete with the quality of the present disclosure. Certainly, the apparatus for pasting warm edge spacers of the present disclosure is not only limited to pasting warm edge spacers, but also can be used for pasting other striped objects or components.

Figure 1:
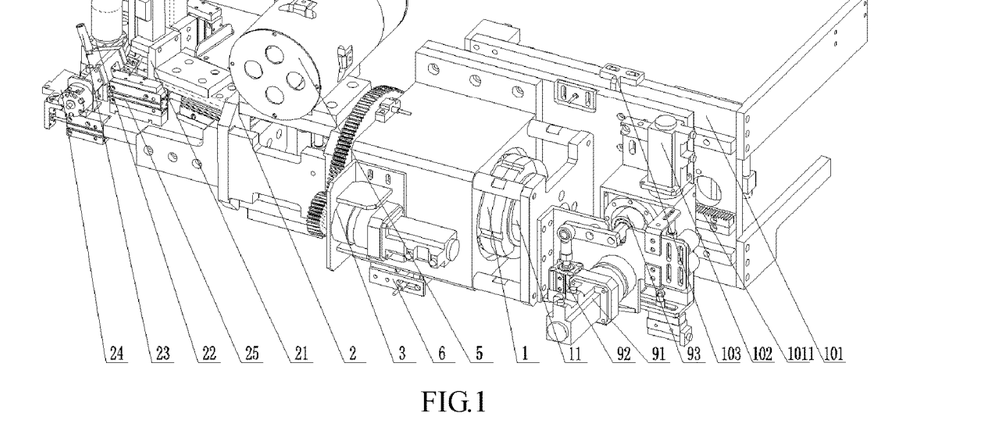
FIG. 1 is a front perspective view of an apparatus for pasting warm edge spacer according to an embodiment of the present disclosure.
Figure 2:
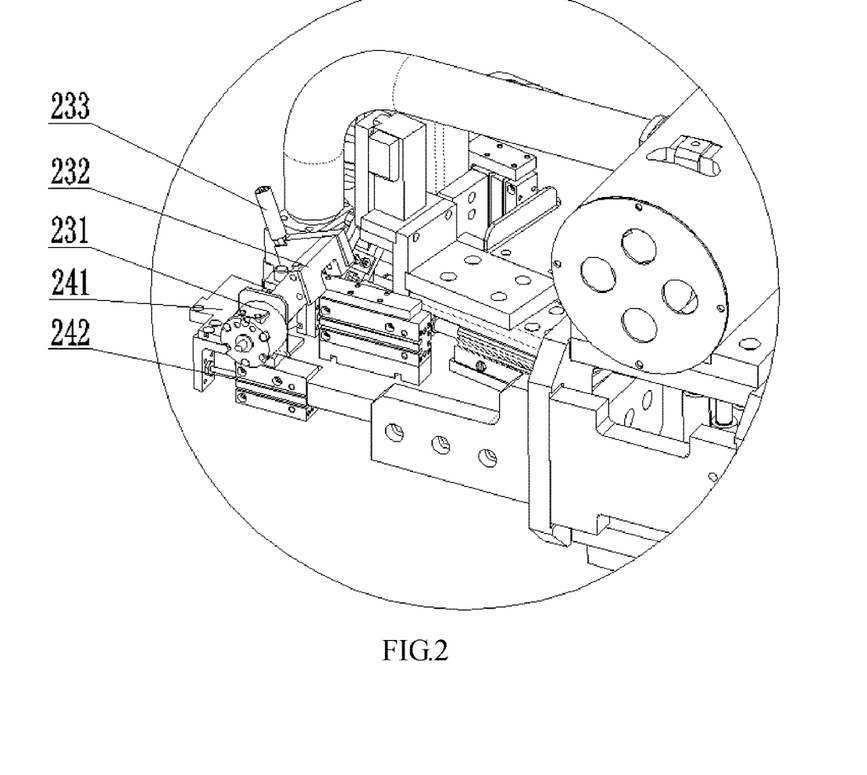
FIG. 2 is a partial enlarged view of FIG. 1.
Figure 3:
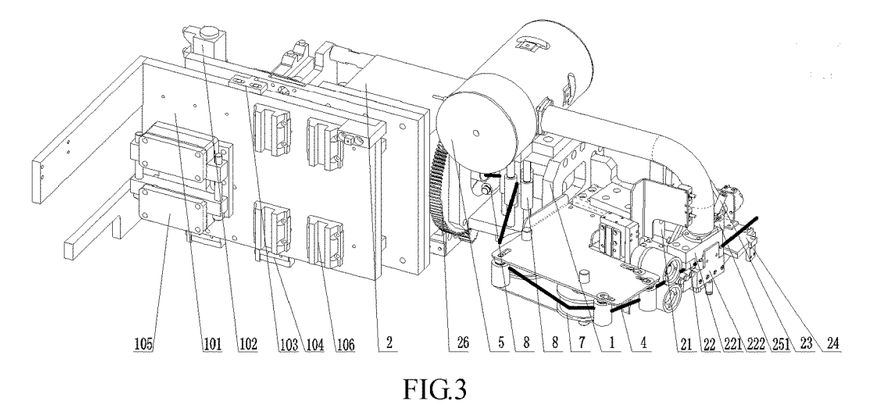
FIG. 3 is a back perspective view of an apparatus for pasting warm edge spacer according to an embodiment of the present disclosure.
Figure 4:
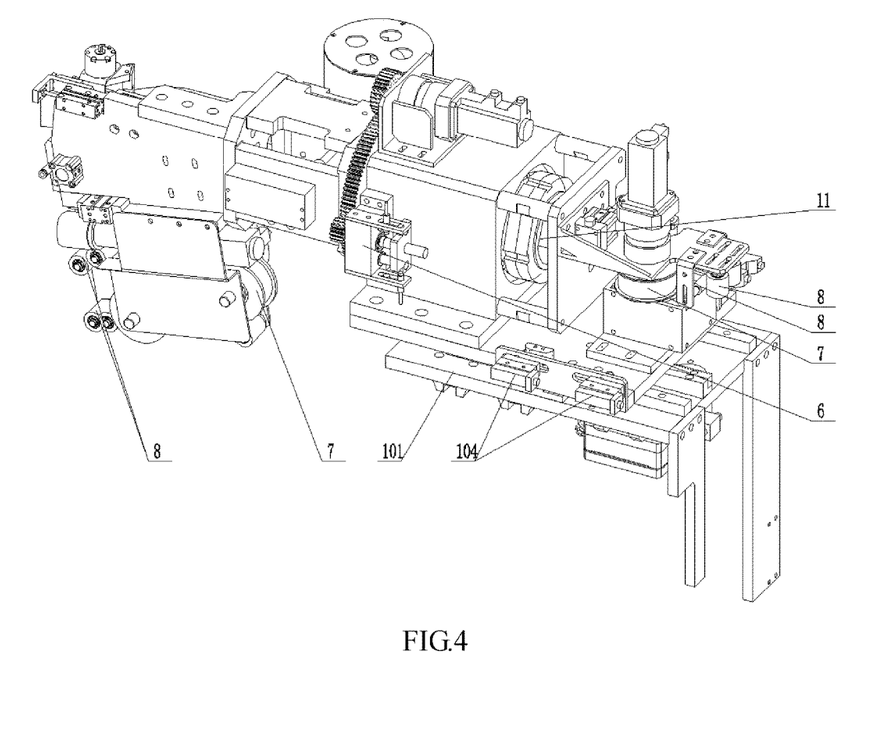
FIG. 4 is a bottom perspective view of an apparatus for pasting warm edge spacer according to an embodiment of the present disclosure.
Figure 5:
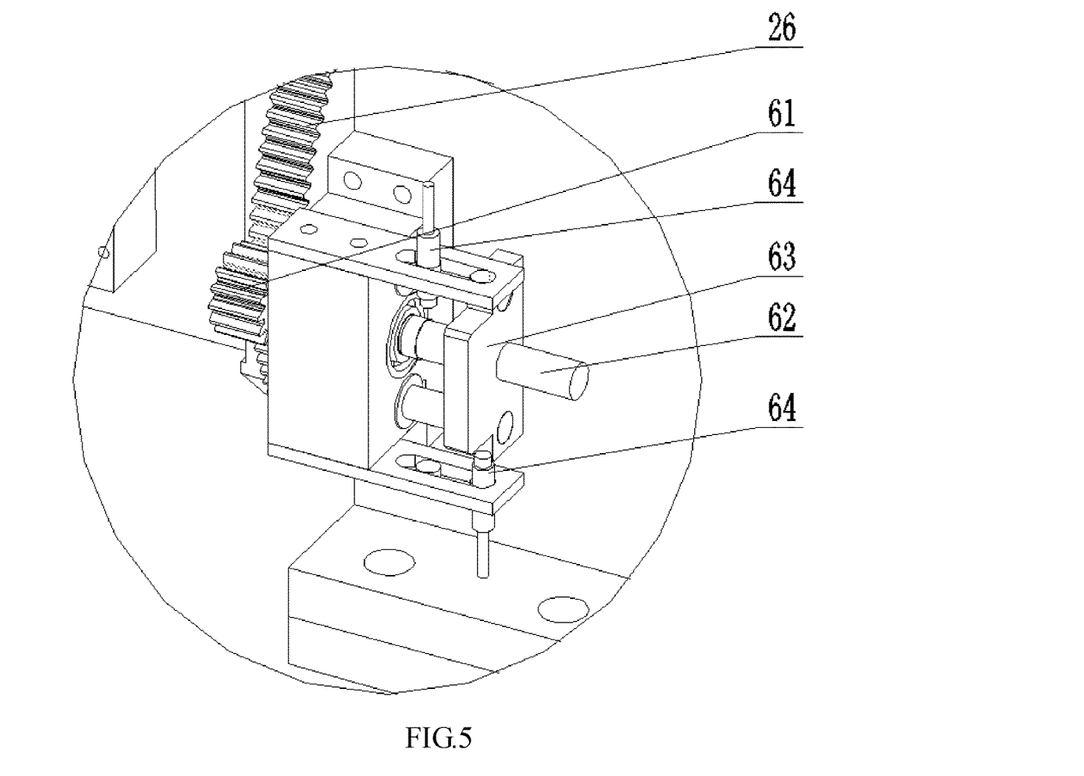
FIG. 5 is a partial enlarged view of FIG. 4 showing a rotation monitoring device 6.

In detail, referring to what's shown in the figures, FIG. 1, FIG. 3 and FIG. 4 are the front perspective view, and the back perspective view and the bottom perspective view of an embodiment of an apparatus for pasting warm edge spacers provided by the present disclosure respectively. FIG. 2 and FIG. 5 are the partial enlarged view of corresponding parts. The apparatus for pasting warm edge spacers includes two parts at the front and back, wherein the one located at the back is a first conveying mechanism 1 which is used for receiving a warm edge spacer conveyed by other mechanisms and conveying the warm edge spacer to a second conveying mechanism 2 located at the front. A rotating mechanism 3 is set at the position where the first conveying mechanism 1 and the second conveying mechanism 2 connects, and the rotating mechanism 3 is connected to the second conveying mechanism 2 via gears, chains or conveyors and drives the second conveying mechanism 2 to rotate. Certainly, the rotating mechanism 3 may be also set on other mechanisms, and is not limited to be set on the first conveying mechanism 1 only. In this way, it makes the warm edge spacer conveyed from the front of the second conveying mechanism 2 can rotate desired angles as needed, and then complete the pasting work of the warm edge spacer continuously and steadily.

For the convenience of conveying the warm edge spacer, a conveying tunnel 11 is set in both the first conveying mechanism and the second conveying mechanism. The warm edge spacer 4 is conveyed from the back of the first conveying mechanism 1 to the second conveying mechanism 2 through the conveying tunnel 11.

Accordingly, for making the warm edge spacer able to be pasted at the corresponding position of the glass stably and reliably, a cutting unit 21, a pressing unit 22, an auxiliary pressing unit 23, a positioning unit 24 and a pasting unit 25 are set at the front of the second conveying mechanism 2, wherein the cutting unit 21 is set at one side of the pressing unit 22, and the glass which is ready to be pasted is set at the other side of the pressing unit 22. The both ends of the pressing unit 22 are the entrance and exit of the warm edge spacer 4, which makes the conveying direction of the warm edge spacer 4 is perpendicular to the cutting direction of the cutting unit 21. The positioning unit 24 is set at the lower side of the pressing unit 22 in correspondence to the exit of the warm edge spacer 4 for positioning the accurate position on the glass where the warm edge spacer needs to be pasted. The auxiliary pressing unit 23 is set at the upper side of the pressing unit 22 for pressing the warm edge spacer 4 at the corresponding position of the positioning unit 24 so that the warm edge spacer can be positioned accurately. The pasting unit 25 is set at the other side of the warm edge spacer which is opposite to the glass, i.e. the positioning unit 24 and the auxiliary pressing unit 23 restrict the upper and lower position of the warm edge spacer at a desired position, then the pasting unit 25 pastes the warm edge spacer on the glass at a horizontal position (or the front and back position).

Thus, the procedure of pasting the warm edge spacer is obtained, which comprises: first, the warm edge spacer is conveyed to the front of the second conveying mechanism 2 via the first conveying mechanism 1 so that the warm edge spacer enters the pressing unit 22; then the positioning unit 24 and the auxiliary pressing unit 23 position a conveyed warm edge spacer at a preset position on the glass, and the pasting unit 25 pastes a positioned warm edge spacer on the glass. When the warm edge spacer at one direction is about to finish being pasted, the cutting unit 21 cuts the unnecessary waste from the warm edge spacer in the pressing unit 22, then the rotating mechanism 3 drives the second conveying mechanism 2 to rotate a certain angle, so that the pasting work of the warm edge spacer continues along the rotated angle, till all the pasting task is completed.

As can be seen from the above embodiment, the apparatus for pasting warm edge spacer employs the first conveying mechanism 1 and the second conveying mechanism 2 set at the front and back and the rotating mechanism 3 for driving the second conveying mechanism 2 to rotate so that the warm edge spacer 4 can automatically rotate and be pasted continually, and employs a cutting unit 21, a pressing unit 22, an auxiliary pressing unit 23, a positioning unit 24 and a pasting unit 25 set at the front of the second conveying mechanism 2 so that the conveyed warm edge spacer 4 can be pasted on a corresponding position on the glass quickly and steadily. Therefore, the apparatus for pasting warm edge spacers of the present disclosure can implement the pasting operation of the warm edge spacer quickly, steadily and automatically so that the efficiency and accuracy of pasting the warm edge spacer can be further improved.

In an alternative embodiment of the present disclosure, referring to what's shown in the FIG. 3, the pressing unit 22 comprises a holding plate 222 at the lower side, a pressing plate 221 at the upper side and a pressing driving unit (not identified in the figures). The pressing driving unit drives the pressing plate 221 to move towards the holding plate 222 and presses the warm edge spacer tightly so that the pasting of the warm edge spacer is more steady and reliable. The pressing plate 221 is configured with a cutting groove (not shown in the figures) in correspondence to the side of the cutting unit 21 so that the cutting unit 21 enters the pressing unit 22 and cuts the waste from the warm edge spacer. Optionally, a waste hole (not shown in the figures) is set at the upper side of the pressing plate 221, and the waste hole connects to the waste collecting device 5 via a pipe for clearing out the waste in time. Preferably, the holding plate 222 is configured with a protruded board in correspondence to the other side of the cutting unit 21, and the protruded board is used as a platform of the cutting unit 21 for cutting the waste (or there's no acting point). Certainly, the pressing unit 22 may also be set as other mechanisms as needed, and it only needs to make the pressing unit 22 able to convey the conveyed warm edge spacer to the follow-up pasting position steadily and reliably, so that the cutting unit 21 can cut the corresponding waste accurately. In this way, the steadiness of pasting the warm edge spacer may be improved.

Optionally, the cutting unit 21 may also be set correspondingly at the exit of the pressing unit or other positions, and it only needs to make the cutting unit 21 able to cut the corresponding waste from the stabilized warm edge spacer after the warm edge spacer is pressed tightly.

It needs to be strengthened that, the pressing driving unit or other relative driving units of the present embodiment and the sequent embodiments are not limited to a unique driving motor, and they may also be variety driving units such as pneumatic motors, driving cylinders, servomotors and etc.

In an alternative embodiment of the present disclosure, referring to what's shown in the FIG. 2, the auxiliary pressing unit 23 comprises an auxiliary driving part 231, a pressing bar 233 and a driving part 232; the auxiliary driving part 231 drives the pressing bar 233 to rotate via the driving part 232 so that the warm edge spacer is pressed and positioned on the positioning unit 24. That's because the variety errors and the flexible mechanism of the warm edge spacer itself of the warm edge spacer conveyed from the pressing unit 22, make the warm edge spacer hard to be set on the positioning unit 24 exactly. Hence, an auxiliary pressing unit 23 is needed to press and stick the warm edge spacer on the positioning unit 24. The pressing bar 233 is configured with a roller structure in correspondence to the position of the warm edge spacer. That is to say, the pressing bar 233 contacts with the warm edge spacer via the roller structure which can rotate freely. In this way, not only the warm edge spacer may be pressed and positioned on the positioning unit 24, but also the conveying of the warm edge spacer is not affected while pressing and positioning, which improves the steadiness and reliability of conveying the warm edge spacer.

In an alternative embodiment of the present disclosure, referring to what's shown in the FIG. 2, the positioning unit 24 comprises a positioning plate 241 and a positioning plate driving unit 242, and the positioning plate driving unit 242 drives the positioning plate 241 to move. At the beginning, the front of the second conveying mechanism 2 is not able to cling to the glass exactly, and there has to be an initial distance between them. But it needs to cling to the glass while pasting the warm edge spacer. Thus, the effect of the positioning unit 24 is that the positioning plate driving unit 242 drives the front of the positioning plate 241 to cling to the glass so that the warm edge spacer can be pasted on the glass steadily and reliably when the warm edge spacer is being pasted. And the positioning unit 24 may also be set as it may be driven to move up and down to further adjust the pasting position so that the pasting of the warm edge spacer is more accurate.

In an alternative embodiment of the present disclosure, referring to what's shown in the FIG. 3, the pasting unit 25 comprises a pushing part 251 and a pushing driving unit (not shown in the figures). The pushing driving unit drives the pushing part 251 to pinch and push the warm edge spacer so that the warm edge spacer is pasted on the glass, and the pushing part 251 is configured with a roller structure in correspondence to the position of the warm edge spacer and the roller structure rotates freely. In this way, the conveying of the warm edge spacer at the horizontal direction won't be affected during the process of pasting the warm edge spacer, that is, the warm edge spacer may be pasted continuously.

In an alternative embodiment of the present disclosure, referring to what's shown in the FIG. 4 and FIG. 5, the apparatus for pasting warm edge spacers further comprises a rotation monitoring device 6. The rotation monitoring device 6 comprises a rotating wheel 61, a screw 62, a location-limiting plate 63, location-limiting parts (not shown in the figures) and a monitoring sensor 64. The rotating wheel 61 rotationally connects to a rotating part 26 of the second conveying mechanism 2 and rotates with the rotating part 26 synchronously. The screw 62 connects to the rotating wheel 61 and the location-limiting plate 63 respectively so that the rotation of the rotating wheel 61 transforms into the linear motion of the location-limiting plate 63. The location-limiting part is set at both the front and back side of the location-limiting plate 63 for limiting the limit positions of the rotating angle, and the monitoring sensor 64 is set at the side of the location-limiting plate (in correspondence to the limit positions at both side) for monitoring whether the location-limiting plate is moving to the preset position. I.e., the monitoring sensor 64 can monitor the rotating angle of the second conveying mechanism 2. In this way, it not only may prevent the overly rotating angle of the second conveying mechanism 2 from causing accidents, but also can control the rotating angle of the second conveying mechanism 2 accurately, so that it implements the accurate pasting of the warm edge spacer.

In an alternative embodiment of the present disclosure, referring to what's shown in the FIG. 3 and FIG. 4, the apparatus for pasting warm edge spacers further comprises a guiding wheel 7 and a location-limiting wheel 8. The guiding wheel 7 and the location-limiting wheel 8 are set at the corresponding positions where the warm edge spacer is conveyed by the first conveying mechanism 1 and the second conveying mechanism 2. The guiding wheel 7 is used for guiding the moving direction of the warm edge spacer, and the location-limiting wheel 8 is used for limiting the position of the warm edge spacer horizontally and longitudinally, wherein the position of the guiding wheel 7 and the location-limiting wheel 8 may be set as needed, such as at the corner position, the initial position, the entrance position and so on.

Optionally, the guiding wheel 7 is a pulley structure with a guiding groove in the middle which can rotate freely. The location-limiting wheel 8 is two location-limiting bars which are set oppositely. The warm edge spacer passes through the middle of the two location-limiting bars, and the location-limiting wheel 8 achieves the limiting effect. Optionally, the location-limiting wheel 8 includes two set of location-limiting bars which are set horizontally and longitudinally.

In this way, the guiding wheel 7 and the location-limiting wheel 8 enable the warm edge spacer to be conveyed according to the preset route, i.e., enable steady and reliable conveying of the warm edge spacer and can improve the speed and efficiency of conveying the warm edge spacer.

In an alternative embodiment of the present disclosure, referring to what's shown in the FIG. 1, the apparatus for pasting warm edge spacer further comprises a dynamic conveying unit. The dynamic conveying unit comprises a driving wheel (not identified in the figures), a driven wheel 93, a driving wheel driving unit 91 and a driven wheel driving unit 92. The warm edge spacer is set on the driving wheel, and the driving wheel driving unit 91 drives the driving wheel to rotate. The driven wheel 93 can rotate freely, and the driven wheel driving unit 92 drives the driven wheel 93 to approach the driving wheel so that the warm edge spacer is pressed on the driving wheel. Thus, the power of rotation of the driving wheel can drive the warm edge spacer to be conveyed forwardly.

Optionally, multiple set of dynamic conveying units are set at the entrance of the first conveying mechanism 1, the exit of the second conveying mechanism 2 and the conveying tunnel.

Preferably, a part of the guiding wheel 7 may be used as the driving wheel in the dynamic conveying unit, and plays the guiding and conveying role in the meantime.

In an alternative embodiment of the present disclosure, the apparatus for pasting warm edge spacer further comprises a connecting plate 101 and a positioning driving device 102. The first conveying mechanism 1 is set on the connecting plate 101 via a guide rail 1011, and the connecting plate 101 connects the apparatus for pasting warm edge spacers entirely to a preset position. The positioning driving device 102 drives the first conveying mechanism 1 to move along the guide rail 1011. In this way, after the apparatus for pasting warm edge spacers is installed and fixed, the relative position between the apparatus for pasting warm edge spacers (especially the front of the second conveying mechanism 2) and the glass may be adjust via the positioning driving device 102, so that the accuracy of pasting the warm edge spacer is improved.

In an alternative embodiment of the present disclosure, the apparatus for pasting warm edge spacer further comprises a zero-crossing detecting unit 103 and a limit positioning unit 104. The zero-crossing detecting unit 103 detects the initial starting position of the apparatus for pasting warm edge spacers; and the limit positioning unit 104 detects the front and back limit position of the motion of the apparatus for pasting warm edge spacers and limits the motion of the apparatus for pasting warm edge spacers when reaches the limit position. In this way, it enables the apparatus for pasting warm edge spacers to start at the same preset initial position every time it starts which improves the accuracy of the motion and adjustment of the whole apparatus. And the limit positioning unit 104 limits the limit positions of the whole apparatus which improves the safety and stability of the apparatus.

Optionally, the connecting plate 101 is also configured with a mounting base 105 and a slider 106. The mounting base 105 is used for installation of a synchronous elevating belt in the whole insulated glass manufacture system, wherein the synchronous elevating belt is set in a head elevating mechanism for driving the whole apparatus for pasting warm edge spacers to move up and down, so that the pasting of the warm edge spacer at four corners of the insulated glass is completed. The slider 106 is used for working with an elevating slide so that the apparatus for pasting warm edge spacers moves along the elevating slide.

Figure 6:
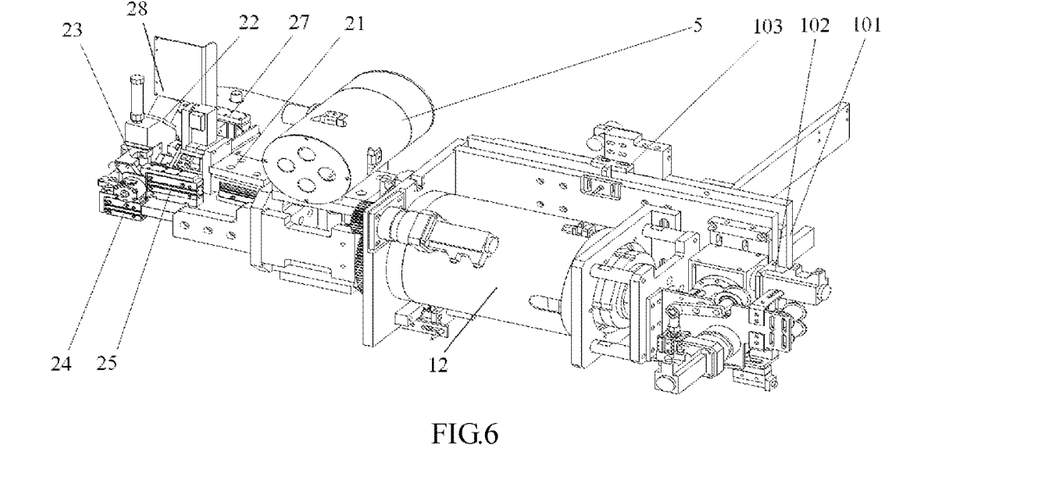
FIG. 6 is a front perspective view of an apparatus for pasting warm edge spacer according to another embodiment of the present disclosure.

In some other alternative embodiments of the present disclosure, referring to what's shown in the FIG. 6, the first conveying mechanism 1 connects to the second conveying mechanism 2 via a conducting slip ring 12 so that they rotationally connect to each other. This not only enables the rotational connection between the first conveying mechanism 1 and the second conveying mechanism 2 not to be affected, but also enables the orderly connection of the wires between devices not to be affected by the rotation, so that the operating steadiness of the whole pasting apparatus is improved. Certainly, other structures which can enable the rotational connection between the first conveying mechanism 1 and the second conveying mechanism 2 may be chosen as needed.

Figure 7:
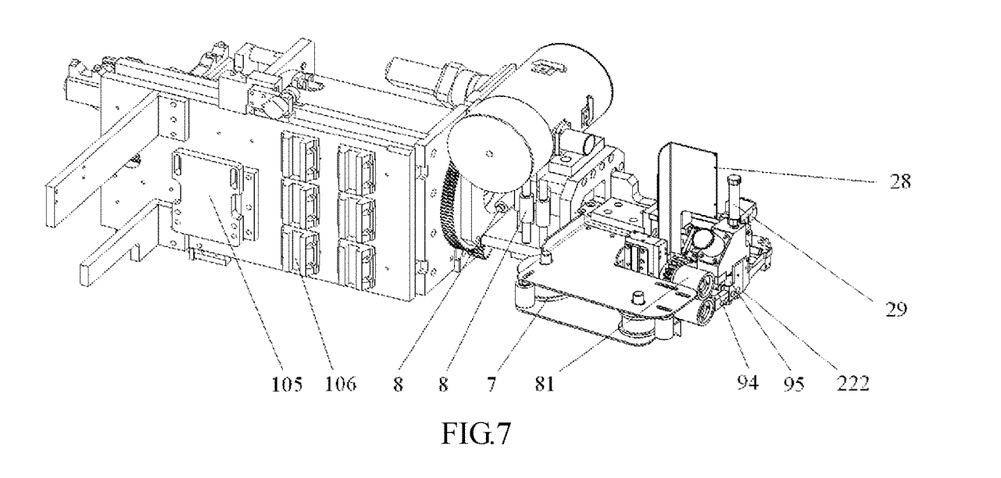
FIG. 7 is a back perspective view of an apparatus for pasting warm edge spacer according to another embodiment of the present disclosure.

Optionally, referring to what's shown in the FIG. 6 and FIG. 7, the pressing unit 22 includes a pressing part and a pressing cylinder 29, wherein the pressing part can enable the warm edge spacer to pass through itself and enable the cutting unit 21 to cut the warm edge spacer in the pressing part. In this way, it not only enables the mechanisms more compact, but also reduces the interference of the external factors.

In some alternative embodiments, referring to what's shown in the FIG. 6 and FIG. 7, a longitudinal positioning sensor is set at the front of the second conveying mechanism 2 as well, for positioning the longitudinal position of the warm edge spacer. Furthermore, a longitudinal positioning sensor holder is set as well, for installing the longitudinal positioning sensor. This enables the positioning of longitudinal position of pasting the warm edge spacer to be implemented.

In some alternative embodiments, referring to what's shown in the FIG. 6, a set of front pressing cylinders 27 is set at the front of the second conveying mechanism 2 as well, for pressing the warm edge spacer conveyed to the front of the second conveying mechanism 2, so that the warm edge spacer can be conveyed along the preset route and the steadiness of the whole pasting apparatus is improved eventually.

In some preferable embodiments, referring to what's shown in the FIG. 7, a front guiding wheel 81 is set at the entrance end of the pressing unit 22, i.e. the entrance of the warm edge spacer. The front guiding wheel 81 is used for conveying the warm edge spacer to the entrance of the pressing unit 22 along the accurate position combining the guiding wheel 7 and the location-limiting wheel 8, i.e. enables the steady and reliable conveying of the warm edge spacer to be implemented.

Furthermore, referring to what's shown in the FIG. 7, a dynamic conveying unit is set at front of the second conveying mechanism 2 as well. The dynamic conveying unit includes a main conveying wheel 94 and a holding wheel 95, wherein the main conveying wheel 94 is used for providing the conveying of the warm edge spacer with conveying power and the holding wheel 95 is used for holding the warm edge spacer, especially for holding and supporting the warm edge spacer during the cutting process.

Those ordinary skilled in the art will appreciate that any of the embodiments discussed are exemplary only without intention of implying that the scopes of the present disclosure (including claims) are limited to these examples; the embodiments or the features in the different embodiments may be combined and the steps may be implemented in any order in accordance with the idea of the present disclosure, and there are many other variations of the different aspects of the present disclosure as described herein without description in the details for simplicity.

In addition, the connections to the integrated circuit (IC) chip(s) and the known power source/ground of other parts may be shown or not shown in the provided figures, in order to simplify the description and discussion, and not to make the present disclosure hard to understand. Additionally, the apparatus may be illustrated in the manner of block diagrams to prevent that the disclosure is difficult to understand, which also concerns about the following facts that the details about the embodiments of these block-diagram apparatuses highly depend on the platform which will implement the present disclosure (i.e. these details must be completely understandable for those ordinary skilled in the art). After specific details (such as circuits) are illustrated to describe the example embodiments of the present disclosure, it's obvious to those ordinary skilled in the art that the present disclosure may be implemented under the circumstances with these specific details or varied details. Thus, these descriptions should be taken as illustration not limitation.

Although the present disclosure has been described combined with the specific embodiments of the present disclosure, the substitution, modification and variation of these embodiments will be apparent to those ordinary skilled in the art according to the previous description. For example, other memories (such as dynamic RAM (DRAM)) may use the discussed embodiments.

The embodiments of the present disclosure are designed in order to include all these substitutions, modifications and variations which fall into the broad scope of the enclosed claims. Thus, any omission, modification, equivalent substitution, improvement, etc. which is in accordance with the spirit and principle of the present invention, should all be included in the scope of the present disclosure.

What is claimed is:

1. An apparatus for pasting a warm edge spacer, comprising:
    a first ring-like conveying mechanism al located at the back of the apparatus and a second rotatable conveying mechanism located at the front of the apparatus;
    a rotating mechanism (3) made of a set of gears, which is arranged on the first ring-like conveying mechanism (1) and can drive the second rotatable conveying mechanism (2) to rotate;
    a conveying tunnel (11) connected each other between the first ring-like conveying mechanism (1) and the second rotatable conveying mechanism (2), wherein a warm edge spacer is able to be conveyed from the central hole of the first ring-like conveying mechanism (1) to the second rotatable conveying mechanism (2) through the conveying tunnel (11);
    a cutting unit (21), a pressing unit (22) comprising a pressing plate (221) at the upper side, a holding plate (222) at the lower side and a pressing driving unit which can drive the pressing plate (221) to move towards the holding plate (222), an auxiliary pressing unit (23) comprising an auxiliary driving part (231), an auxiliary pressing bar (233) and a moving part (232), a positioning unit (24) comprising a positioning plate (241) and a positioning plate driving unit (242) which driving the positioning plate (241) to move, and a pasting unit (25) comprising a pushing part (251) and a pushing driving unit, which all set at the front of the second rotatable conveying mechanism (2), wherein the cutting unit (21) is set at one side of the pressing unit (22); the positioning unit (23) is set at the lower side of the pressing unit (22) in correspondence to the exit of the warm edge spacer, the auxiliary pressing unit (23) is set at the upper side of the pressing unit (22), and the pasting unit (25) is configured to paste the warm edge spacer onto a glass and the warm edge spacer is between the pasting unit (25) and the glass;
    wherein the cutting unit (21) cuts the unnecessary waste from the warm edge spacer in the pressing unit (22), then the positioning unit (24) and the auxiliary pressing unit (23) position a conveyed warm edge spacer at a preset position on the glass, and the pasting unit (25) pastes a positioned warm edge spacer on the glass at last.

2. The apparatus according to claim 1, wherein the pressing plate (221) is configured with a cutting groove in correspondence to the side of the cutting unit (21) so that the cutting unit (21) can enter the pressing unit (22) and cut the waste from the warm edge spacer; a waste hole is set at the upper side of the pressing plate (221), and the waste hole connects to a waste collecting device comprising collection canister (5) via a pipe.

3. The apparatus according to claim 1, wherein the auxiliary driving part (231) can drives the pressing bar (233) to rotate via the driving part (232) so that the warm edge spacer can be pressed and positioned on the positioning unit (24); the pressing bar (233) is configured with a roller structure in correspondence to the position of the warm edge spacer, and the roller structure can rotate freely, wherein the auxiliary driving part (231) and the driving part (232) are selected from driving motors, pneumatic motors, driving cylinders or servomotors.

4. The apparatus according to claim 1, wherein the positioning plate driving unit (242) is selected from driving motors, pneumatic motors, driving cylinders or servomotors.

5. The apparatus according to claim 1, wherein the pushing driving unit can drives the pushing part (251) to push the warm edge spacer so that the warm edge spacer is pasted on the glass; the pushing part (251) is configured as a press roller in correspondence to the position of the warm edge spacer, and the press roller can rotate freely; the pushing driving unit is selected from driving motors, pneumatic motors, driving cylinders or servomotors.

6. The apparatus according to claim 1, further comprising a guiding wheel (7) and a location-limiting wheel (8), wherein the guiding wheel (7) and the location-limiting wheel (8) are set at the corresponding positions where the warm edge spacer is conveyed by the first ring-like conveying mechanism (1) and the second rotatable conveying mechanism (2); the guiding wheel (7) is used for guiding the moving direction of the warm edge spacer, and the location-limiting wheel (8) is used for limiting the location of the warm edge spacer horizontally and longitudinally.

7. The apparatus according to claim 1, further comprising a dynamic conveying unit, wherein the dynamic conveying unit comprises a driving wheel, a driven wheel (93), a driving wheel driving unit (91) and a driven wheel driving unit (92); the warm edge spacer is set on the driving wheel, the driving wheel driving unit (91) drives the driving wheel to rotate; the driven wheel (93) can rotate freely, and the driven wheel driving unit (92) drives the driven wheel (93) to approach the driving wheel so that the warm edge spacer is pressed on the driving wheel, wherein driving wheel driving unit (91) and a driven wheel driving unit (92) are selected from driving motors, pneumatic motors, driving cylinders or servomotors.

8. The apparatus according to claim 1, further comprising a connecting plate (101) and a positioning driving device (102), wherein the first ring-like conveying mechanism (1) is set on the connecting plate (101) via a guide rail (1011), the connecting plate (101) connects the apparatus for pasting warm edge spacer entirely to a preset position; and the positioning driving device (102) drives the first ring-like conveying mechanism W to move along the guide rail (1011), wherein the positioning driving device (102) is selected from driving motors, pneumatic motors, driving cylinders or servomotors.

9. The apparatus according to claim 8, further comprising a zero-crossing detecting unit (103) and a limit positioning unit (104) each configured as a metal bracket, wherein the zero-crossing detecting unit (103) detects the initial starting position of the apparatus for pasting warm edge spacers; and the limit positioning unit (104) detects the front and back limit position of the motion of the apparatus for pasting warm edge spacers and limits the motion of the apparatus for pasting warm edge spacers when reaches the limit position.

\* \* \* \* \*